(12) United States Patent
Mullin

(10) Patent No.: US 10,551,043 B1
(45) Date of Patent: Feb. 4, 2020

(54) PORTABLE LIGHTING SYSTEM

(71) Applicant: Brent Mullin, Graham, TX (US)

(72) Inventor: Brent Mullin, Graham, TX (US)

(*) Notice: Subject to any disclaimer, the term of this patent is extended or adjusted under 35 U.S.C. 154(b) by 0 days.

(21) Appl. No.: 15/835,949

(22) Filed: Dec. 8, 2017

Related U.S. Application Data

(60) Provisional application No. 62/431,652, filed on Dec. 8, 2016.

(51) Int. Cl.
| | |
|---|---|
| F21V 21/14 | (2006.01) |
| F21S 9/02 | (2006.01) |
| F21V 21/08 | (2006.01) |
| F21W 131/10 | (2006.01) |
| B60Q 7/00 | (2006.01) |
| F21Y 115/10 | (2016.01) |
| F21V 21/22 | (2006.01) |

(52) U.S. Cl.
CPC .............. F21V 21/145 (2013.01); F21S 9/02 (2013.01); F21V 21/0824 (2013.01); B60Q 7/00 (2013.01); F21V 21/22 (2013.01); F21W 2131/10 (2013.01); F21Y 2115/10 (2016.08)

(58) Field of Classification Search
CPC ....................................................... F21V 21/145
USPC ................................................... 362/449, 183
See application file for complete search history.

(56) References Cited

U.S. PATENT DOCUMENTS

| | | | | |
|---|---|---|---|---|
| 2008/0192461 A1* | 8/2008 | Chien | ....................... | F21S 9/02 362/183 |
| 2011/0063827 A1* | 3/2011 | Cristoforo | ............ | F21V 21/0816 362/191 |
| 2012/0275141 A1* | 11/2012 | Keith | ........................ | F21L 4/00 362/158 |
| 2015/0192243 A1* | 7/2015 | Sharrah | .................. | F16M 11/28 362/190 |
| 2016/0201885 A1* | 7/2016 | Rood | ........................ | F21L 4/08 362/183 |

* cited by examiner

*Primary Examiner* — Allyson N Trail
(74) *Attorney, Agent, or Firm* — James E. Walton

(57) ABSTRACT

A portable lamp includes an illumination module, a shaft supporting the illumination module, a base module configured to support the shaft and the illumination module; and a power module, including an electrical power source and a cable configured to connect to the power source, the power module electrically coupled to the illumination module.

6 Claims, 3 Drawing Sheets

PORTABLE LIGHTING SYSTEM

BACKGROUND

1. Field of the Invention

The present invention relates generally to lighting apparatus, and in particular to portable lights for use away from conventional AC power sources.

2. Description of Related Art

A variety of portable and battery-powered lighting apparatus exists, ranging from entirely self-contained flashlights to lanterns and other forms of "work lights." Thus, there exists significant room for improvement in the art of portable lighting.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
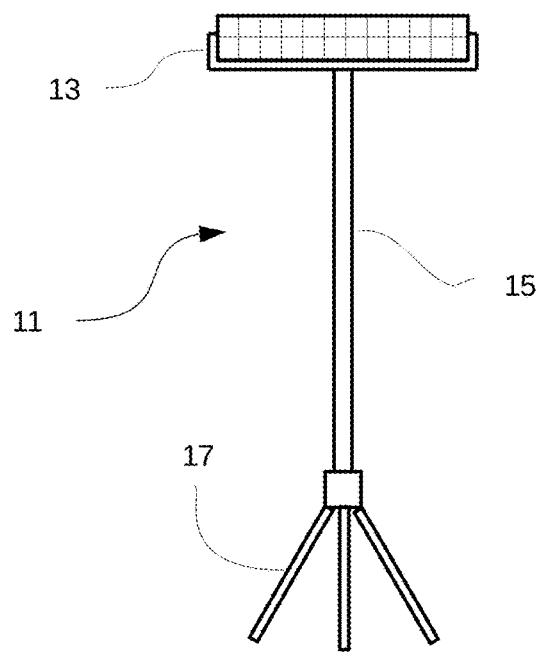
FIG. 1 is an elevation view of a portable lamp according to one embodiment of the present invention.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Figure 4:
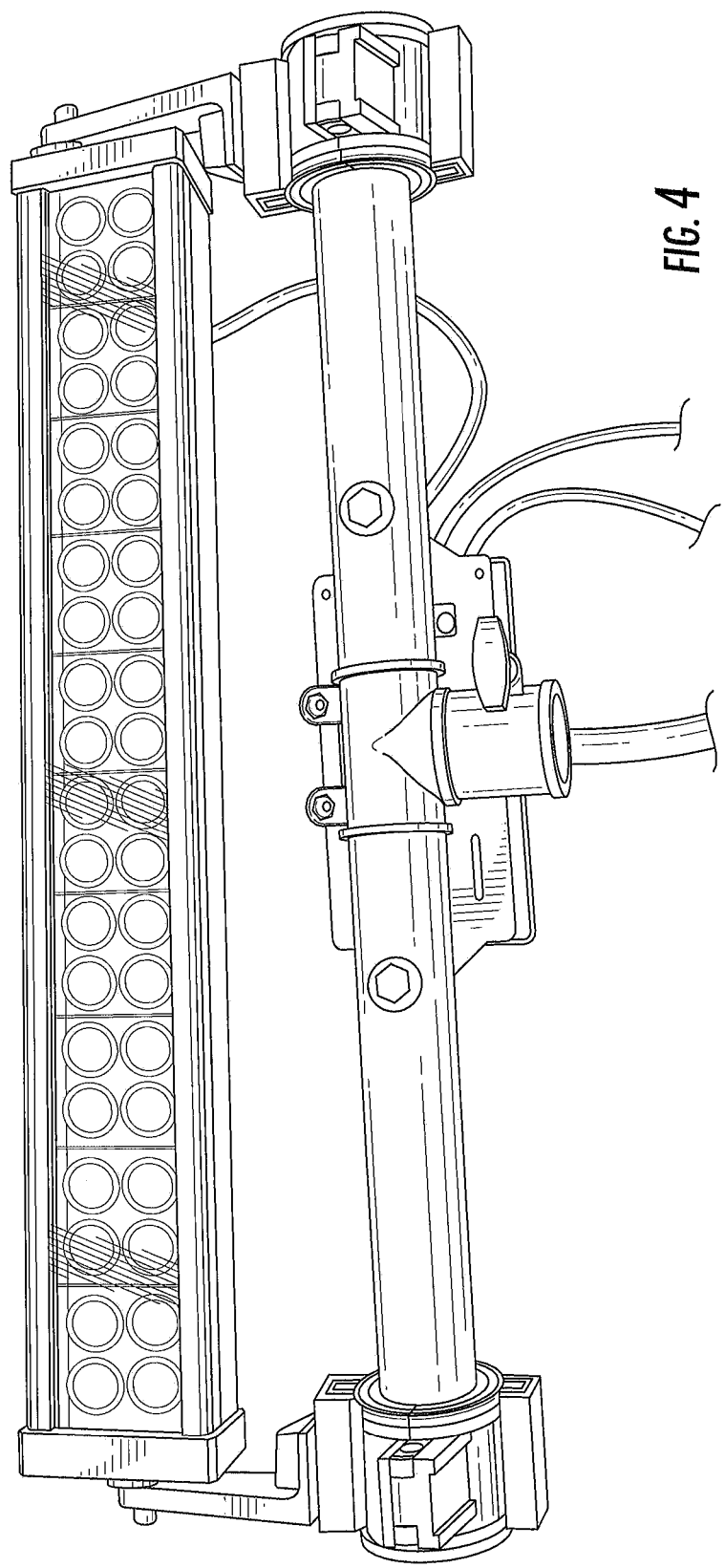
FIG. 4 is a photograph of a lamp module of a portable lamp according to an embodiment of the present invention.
Figure 5:
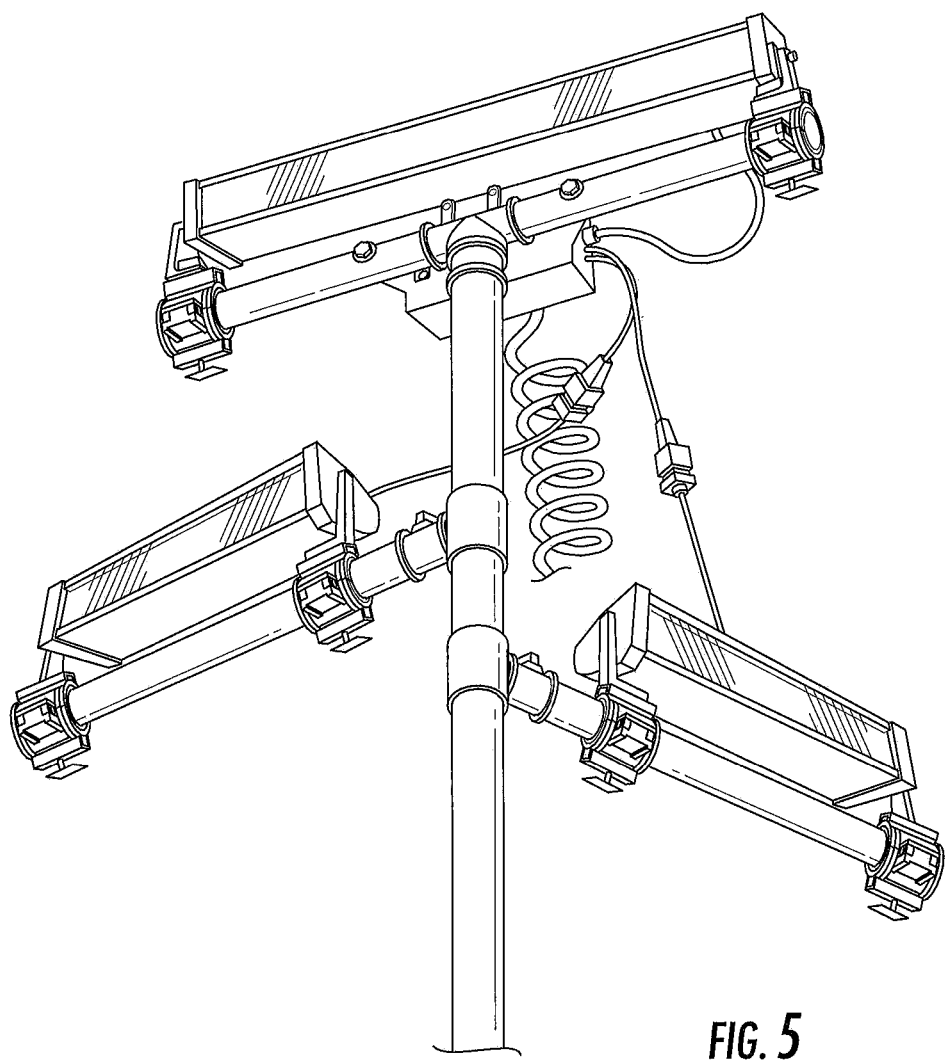
FIG. 5 is a photograph of a portable lamp according to an embodiment of the present invention.

Referring now to the Figures, FIG. 1 illustrates an embodiment of the portable lamp 11 of present invention. An illumination module 13 in the form of an high-intensity LED lamp or light 13 is positioned at the upper end of a height-adjustable telescoping shaft or pole 15. Illumination module 13 is preferably an high-intensity array (or "light bar") of LED elements, as shown more particularly in FIG. 4. LEDs are preferred for their very high-intensity illumination or brightness and their low power consumption. LED's may be colored or white, or organic LEDs (OLED) capable of changing color. Lamp 13 may also comprise several bars or banks of LEDs, each bar or bank secured to pole 15, as illustrated in FIG. 5. Each illumination element preferably may be rotated and/or tilted relative to pole 15 for maximum flexibility in positioning.

Figure 2:
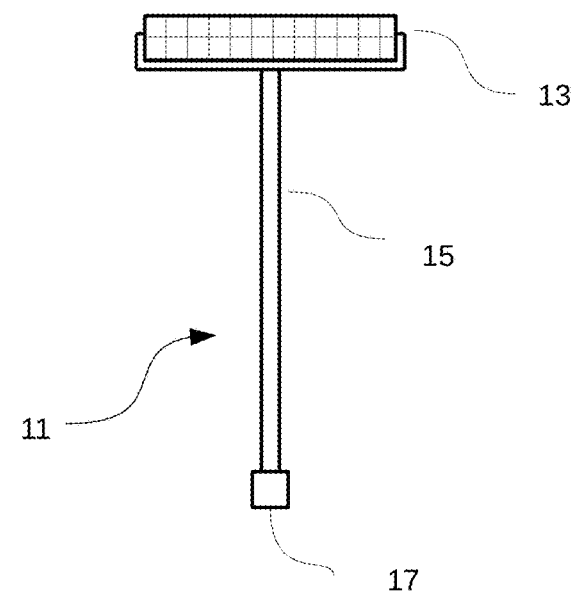
FIG. 2 is an elevation view of a portable lamp according to another embodiment of the present application.
Figure 3:
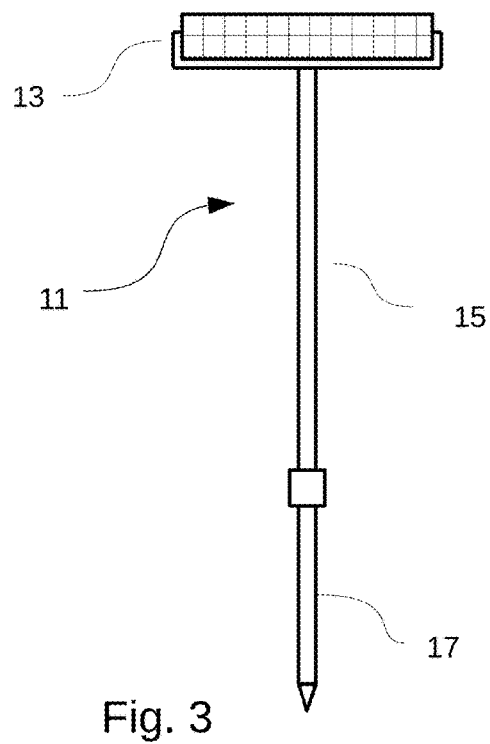
FIG. 3 is an elevation view of a portable lamp according to still another embodiment of the present application.

A base module 17, preferably in the form of a removable and collapsible tripod, is positioned at a lower or opposite end of shaft or pole 15, as depicted in FIG. 1. In this configuration, lamp 11 is adapted to be positioned on relatively level ground with no other mounting or positioning apparatus. In other configurations, tripod 17 may be replaced by a trailer-hitch receiver, as shown in FIG. 2; or a stake (to be pushed into relatively soft ground), as illustrated in FIG. 3. Other base modules may include a bracket adapted to be secured to a wire fence such as cyclone or barbed wire; a hook for attachment to an overhead structure such a tree limb; or a clamp configured for attachment to a post, tree trunk or limb, or other vertical or horizontal structure.

Base module 17 may be removably connected to shaft or pole 15 by a secure, stable connection such as threads, a bayonet-type connection, friction fit, or the like. The connection means should be sufficiently easy to operate that base modules 17 may be removed and replaced quickly and easily with no or few tools.

Lamp 13 is preferably electrically powered by power module that may comprise a rechargeable DC power source, such as a vehicle battery, connected to lamp 13 through a cable (which may pass through a hollow shaft or pole 15) to the trailer hitch outlet of the vehicle; by cables connected directly to the battery; or through a cigarette lighter outlet. Lamp 13 may also be connected to an AC wall outlet or extension cord. The power module preferably includes any necessary adapters and/or transformers. Lamp 13 may also be powered by one or more rechargeable battery packs, such as used by cordless power tools. The power module thus may comprise an electrical power source and cable, including connectors, adapters, and transformers, that is electrically coupled to lamp 13 and also to an electrical power source. The cables may run inside or outside shaft 15. Exterior cables are shown in FIGS. 4 and 5.

An electronic control module may be provided to control aspects of lamp 13, such as the intensity or brightness of the lamp or the color of the lamp. Control module may be provided with wireless networking or communications, such as Bluetooth or WiFi, to enable centralized control of multiple lamps 13 from a single or multiple control module or a smartphone app.

One preferred use is to illuminate a playing field for kids to practice/play soccer or other sports/games at night. As such, multiple units could be tethered together and powered off of a single vehicle and/or battery or multiple vehicles/batteries. Other applications include camping, hunting, and fishing and general-purpose emergency use when other lighting fails or is unavailable.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A portable lamp comprising:
an illumination module;
a shaft supporting the illumination module;

an interchangeable base module configured to support the shaft and illumination module; and a power module, including an electrical power source and a cable configured to connect to the electrical power source, the power module electrically coupled to the illumination module;

wherein the base module is removable from the shaft and may be replaced by another base module while the power module remains electrically coupled to the illumination module;

wherein the electrical power source is distinct and separate from the illumination module and the base module; and wherein the electrical power source is stationary while the portable lamp is in use.

2. The portable lamp of claim 1, wherein the base module further comprises at least one of:
   a trailer-hitch receiver;
   a stake;
   a bracket that secures the portable lamp to a fence;
   a hook that secures the portable lamp to a separate structure;
   a clamp that secures the portable lamp to a separate structure.

3. The portable lamp according to claim 1, wherein the power module further comprises at least one of:
   a vehicle battery and cable electrically coupled to a trailer hitch outlet of the vehicle;
   a vehicle battery and cable electrically coupled directly to the vehicle battery;
   a vehicle battery and cable electrically coupled to the vehicle battery through a cigarette lighter outlet;
   an AC outlet or cable electrically coupled to the AC outlet through a transformer; and
   a rechargeable battery pack and cable coupled to the battery pack.

4. The portable lamp according to claim 3, wherein the power module is removable from the lamp and may be replaced by another power module.

5. The portable lamp according to claim 1, wherein the illumination module is an array of high-intensity LEDs.

6. The portable lamp according to claim 1, wherein the shaft is a rigid hollow shaft that supports the cable, the cable extending through at least a portion of the shaft between the illumination module and the base module.

\* \* \* \* \*